US010267897B2

(12) United States Patent
Jenkins (10) Patent No.: US 10,267,897 B2
(45) Date of Patent: Apr. 23, 2019

(54) FMCW RADAR BLOCKING DETECTION (71) Applicant: VEONEER SWEDEN AB, Vargarda (SE)

(72) Inventor: Alan Jenkins, Allershausen (DE)

(73) Assignee: VEONEER SWEDEN AB, Vargarda (SE)

(*) Notice: Subject to any disclaimer, the term of this patent is extended or adjusted under 35 U.S.C. 154(b) by 468 days.

(21) Appl. No.: 14/892,638

(22) PCT Filed: May 16, 2014

(86) PCT No.: PCT/SE2014/050601
§ 371 (c)(1),
(2) Date: Nov. 20, 2015

(87) PCT Pub. No.: WO2014/189443
PCT Pub. Date: Nov. 27, 2014

(65) Prior Publication Data
US 2016/0091599 A1 Mar. 31, 2016

(30) Foreign Application Priority Data

May 23, 2013 (EP) .................... 13168943

(51) Int. Cl.
G01S 7/40 (2006.01)
G01S 13/34 (2006.01)
G01S 13/93 (2006.01)
G01S 13/28 (2006.01)

(52) U.S. Cl.
CPC ............ G01S 7/4004 (2013.01); G01S 13/34 (2013.01); G01S 13/343 (2013.01); G01S 13/931 (2013.01); G01S 13/288 (2013.01); G01S 2007/4039 (2013.01)

(58) Field of Classification Search
CPC ...... G01S 7/4004; G01S 13/343; G01S 13/34; G01S 13/288; G01S 2007/4039–2007/4047; G01S 13/9303–13/931
See application file for complete search history.

(56) References Cited

U.S. PATENT DOCUMENTS

| 5,432,516 A | 7/1995 | Cherry et al. |
| 5,959,570 A | 9/1999 | Russell |
| 6,124,823 A * | 9/2000 | Tokoro .................. G01S 7/2927 342/128 |

(Continued)

FOREIGN PATENT DOCUMENTS

EP 1 980 874 A2 10/2008

OTHER PUBLICATIONS

PCT International Search Report—dated Oct. 3, 2014.

Primary Examiner — Matthew M Barker
(74) Attorney, Agent, or Firm — Brinks Gilson & Lione (57) ABSTRACT A method and apparatus for detection of blocking of a frequency-modulated continuous-wave, FMCW, radar device. A first signal being a first transmission signal including an object detection signal is transmitted. A second signal being a frequency offset signal relative the first signal is transmitted. A reception signal including at least a received version of the second signal is received. Blocking of the FMCW radar device is determined by identifying a blocking pattern in the received version of the second reception signal.

14 Claims, 6 Drawing Sheets (56) References Cited

U.S. PATENT DOCUMENTS

| | | | |
|---|---|---|---|
| 6,469,659 B1* | 10/2002 | Lajiness | G01S 7/4004 342/159 |
| 6,611,227 B1 | 8/2003 | Nebiyeloul-Kiffe et al. | |
| 7,205,929 B2* | 4/2007 | Shingyoji | G01S 7/4004 342/27 |
| 7,907,084 B2* | 3/2011 | Sekiguchi | G01S 7/354 342/112 |
| 8,441,394 B2* | 5/2013 | Alland | G01S 7/4026 340/435 |
| 8,922,422 B2* | 12/2014 | Klar | G01S 7/4004 342/175 |
| 9,140,780 B2* | 9/2015 | Heilmann | G01S 7/4004 |
| 2002/0163463 A1 | 11/2002 | Lajiness et al. | |
| 2003/0071753 A1* | 4/2003 | Vacanti | G01S 7/4004 342/173 |
| 2005/0116854 A1* | 6/2005 | Beez | G01S 7/4026 342/70 |
| 2006/0227037 A1 | 10/2006 | Ando et al. | |
| 2007/0085728 A1 | 4/2007 | Matsuoka | |
| 2009/0243912 A1 | 10/2009 | Lohmeier et al. | |
| 2012/0050093 A1* | 3/2012 | Heilmann | G01S 7/4004 342/173 |
| 2012/0268317 A1 | 10/2012 | Himmelstoss et al. | |

* cited by examiner

FMCW RADAR BLOCKING DETECTION

CROSS REFERENCE TO RELATED APPLICATIONS

This application claims priority to European Patent Application No. 13168943.2, filed May 23, 2013 and PCT/SE2014/050601, filed on May 16, 2014.

FIELD OF THE INVENTION

Embodiments presented herein relate to detecting blocking of a radar device, and particularly to detecting blocking of a frequency-modulated continuous-wave, FMCW, radar device.

BACKGROUND

Various object detection systems have been proposed to warn motor vehicle drivers of the presence of an object in the path of a movable vehicle. Typically, such warning systems provide a suitable warning signal either audible or visual or both, upon a sensor detecting the presence of an object in the path of the moving vehicle.

The existence of foreign matter or objects on a radar device such as an automotive radar sensor can impact the accuracy and reliability of the radar device. For example, the foreign matter or objects may undesirably block one or more portions of the radar sensor transmit and/or receive antennas and in particular may block portions of the radio frequency (RF) energy propagating to and from the transmit and receive antennas of the radar sensor.

Such blockage may, for example, be the result of an accumulation, over a period of time, of foreign matter or objects in the region of an antenna aperture. Such foreign matter may be caused for example by environmental conditions such as temperature, humidity, ice, rain and the like. Such blockage can degrade, or in extreme cases even prevent, proper operation of the automotive radar sensor. If the foreign matter accumulates over time, there is a corresponding gradual decrease in sensor system performance over time. Since the accumulation is gradual, it is sometimes relatively difficult to detect the existence of antenna blockage due to the gradual accumulation of foreign matter and corresponding gradual decrease in radar sensor performance.

It would, therefore, be desirable to provide a radar device which is capable of detecting blockage. It would also be desirable to provide a radar device which is capable of detecting blockage due to the accumulation of foreign matter, such as mud, ice, snow or the like, on or proximate a radar radome.

According to US 2009/0243912 A1 there is provided a blockage detection process which involves detecting a target within a virtual detection zone, accumulating target-related information while the target is within the virtual detection zone and based on the information determining if a blind spot alert signal was missed. The process further includes recording a time of the miss in response to a decision being made that a blind spot alert signal was missed, and based upon information for each recorded miss, determining whether a blockage condition exists. Hence the blockage detection disclosed in US published patent application number 2009/0243912 A1 requires recording of precise time information. Further, this blockage detection process introduces ambiguity since the blockage detection is based determining that a blind spot alert signal indeed was missed.

Hence, there is still a need for improved blocking detection of a radar device.

SUMMARY

An object of embodiments herein is to provide improved blocking detection of a radar device.

A method for detecting blocking of a frequency-modulated continuous-wave, FMCW, radar device. The method includes transmitting a first signal being a first transmission signal, the first signal including an object detection signal. The method includes transmitting a second signal. The second signal is a frequency offset signal relative the first signal. The method further includes receiving a reception signal. The reception signal includes at least a received version of the second signal. The method includes determining blocking by identifying a blocking pattern in the received version of the second reception signal.

According to a second aspect of the invention there is presented a frequency-modulated continuous-wave, FMCW, radar device for detecting blocking of the FMCW radar device. The FMCW radar device includes a transmitter arranged to transmit a first signal being a first transmission signal. The first signal includes an object detection signal. The transmitter is further arranged to transmit a second signal. The second signal is a frequency offset signal relative the first signal. The FMCW radar device includes a receiver arranged to receive a reception signal. The reception signal includes at least a received version of the second signal. The FMCW radar device includes a controller arranged to determine blocking by identifying a blocking pattern in the received version of the second reception signal.

Advantageously this enables accurate detection of blocking. Advantageously the processing can be performed very quickly and when needed.

According to an embodiment of the invention the reception signal is subjected to high pass filtering prior to determining blocking. Advantageously the disclosed blocking detection enables accurate detection of blocking even in the presence of such high pass filtering.

It may thereby be possible to insert a second signal from the signal generation part of the system that modulates an FMCW ramp to generate offset sideband frequencies. These can propagate through the transmitter chain, between the transmitter and the receiver, through the receiver chain, into the controller and be processed by part, or all, of already existing signal processing paths. The second signal results in a known blocking pattern, the parameters of which are known and can be checked for blocking detection.

According to a third aspect there is provide an automotive vehicle having an FMCW radar device according to the second aspect.

According to a fourth aspect of the present invention there is presented a computer program for detecting blocking of a frequency-modulated continuous-wave, FMCW, radar device, the computer program having computer program code which, when run on a FMCW radar device, causes the FMCW radar device to perform a method according to the first aspect.

According to a fifth aspect of the present invention here is presented a computer program product having a computer program according to the third aspect and a computer readable means on which the computer program is stored.

It is to be noted that any feature of the first, second, third, fourth and fifth aspects of the invention may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure as well as from the drawings.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
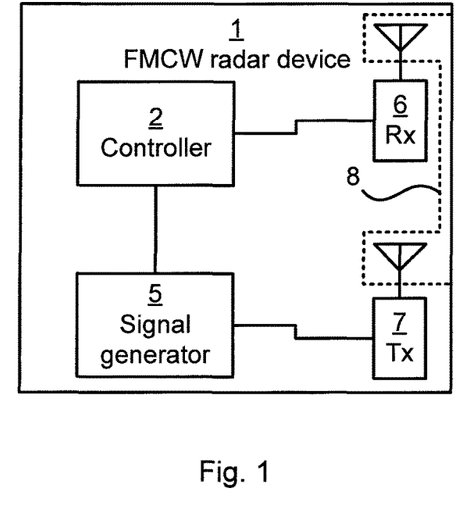
FIG. 1 is a schematic diagram showing functional modules of an FMCW radar device.

FIG. 1 is a schematic diagram showing functional modules of a continuous wave frequency-modulated (FMCW) radar device 1. In general terms, FMCW radar is a short range measuring radar capable of determining distance. The FMCW radar devices provide high reliability by providing distance measurement along with speed measurement. This kind of radar device may be used as an early-warning radar, and/or a proximity sensor. Doppler shift is not always required for detection when FM modulation is used.

The FMCW radar device 1 includes a controller 2 arranged to control the general operation of the FMCW radar device 1. The controller 2 is operatively connected to a signal generator 5. The FMCW radar device 1 further includes a transmitter (Tx) 7. The Tx 7 includes at least one antenna element. The signal generators 5 is arranged to, according to instructions provided by the controller 2, generate signals to be transmitted by the Tx 7. The FMCW radar device 1 further includes a receiver (Rx) 6. The Rx 6 includes at least one antenna element. The Rx 6 is arranged to receive signals and to provide the received signal to the controller 2. The controller 2 is therefore arranged to process received signals. As will be further disclosed below, this arrangement of functional modules enables measurement of the range of the object reflecting the signals by the controller 2. The antenna elements of the Tx 7 and Rx 6 may be provided in a radome 8 of the FMCW radar device 1.

General operations of the FMCW radar device 1 will now be described. In an FMCW radar device 1, a radio frequency (RF) object detection signal, frequency modulated with a given modulation waveform, is transmitted by the Tx 7 towards a target and reflected therefrom back to the FMCW radar device 1 for reception by the Rx 6. The reflected signal as received at the Rx 6 is delayed in time, and hence shifted in frequency, from the instantaneous object detection signal by an amount T proportional to the range R of the target. The range R corresponds to the length-wise distance from the FMCW radar device 1 to the target.

The signal generator 5 is arranged to generate a signal of a known stable frequency continuous wave which varies (up and/or down) in frequency over a fixed period of time by means of a modulating signal. Frequency deviation on the received signal at the Rx 6 increases with distance. The Frequency deviation smears out, or blurs, the Doppler signal. Echoes from a target are then mixed with the transmitted signal to produce a beat signal which will give the distance of the target after demodulation.

A variety of modulations are possible; the transmitter frequency can slew up and down according to a sine wave, a sawtooth wave, a triangle wave, a square wave, and the like. For example, when the object detection signal is modulated by a triangular wave form having a peak to peak value of $\Delta IF$ and a period of $1/f_m$, the frequency shift, or difference frequency $f_R$, also commonly known as the beat frequency, as generated by a suitable filtered mixer receptive of the reflected signal and a signal indicative of the object detection signal, is equal to the time derivative of the frequency of the object detection signal times the round trip time delay, $\tau$, and may thus be expressed as $f_R = df/dt \cdot \tau = 4R(\Delta F \cdot f_m)/c$, where c is the speed of light. Therefore, the range, R, or distance between the target and the FMCW radar device 1 and, additionally, the range rate of the target relative to the FMCW radar device 1 is determined by the measurement of the frequency shift $f_R$. The process by which the range is determined is as such well known in the art.

Figure 5:
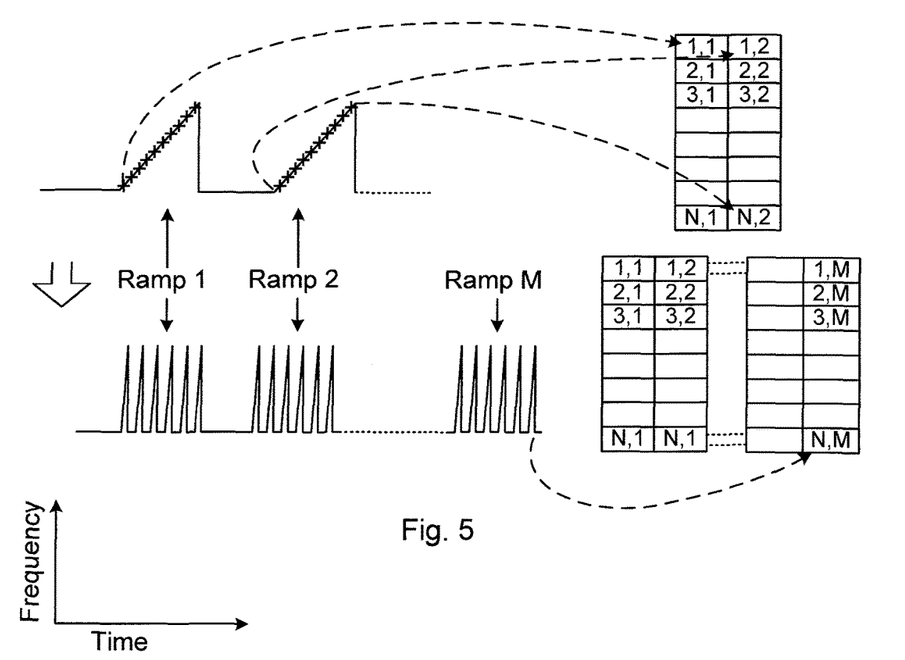
FIG. 5 schematically illustrates a frequency/time structure for a 2D FMCW waveform.
Figure 6:
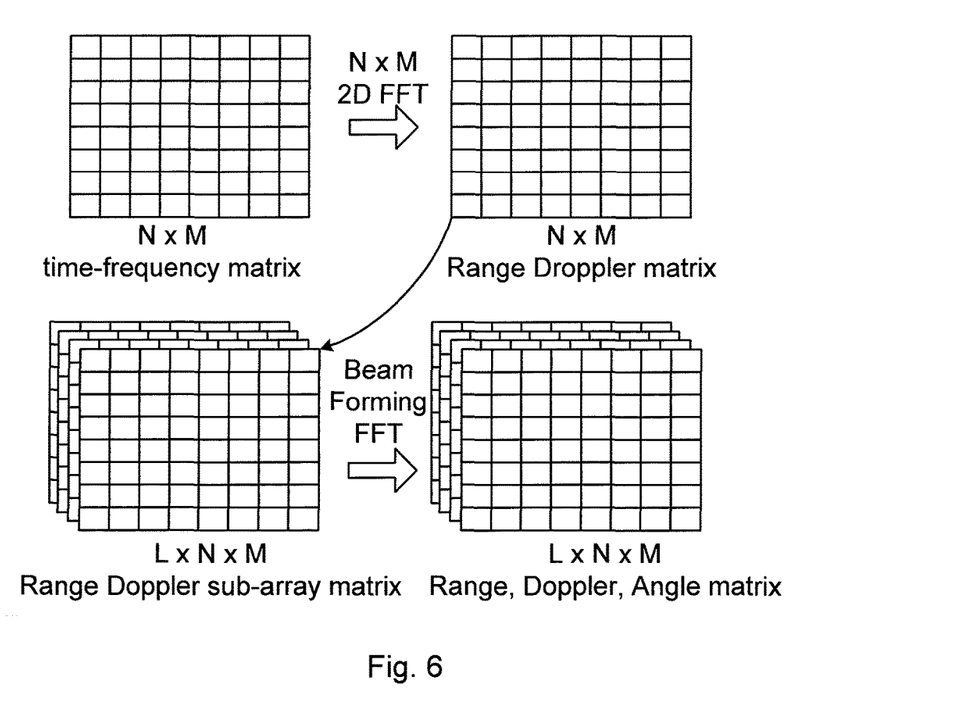
FIG. 6 schematically illustrates matrix processing.

FIG. 5 illustrates the frequency/time structure for a 2D FMCW waveform. The frequency/time structure may be represented as an M×N frequency-time matrix. Illustrated in FIG. 5 is the basic principle of operation of the FMCW radar device 1 using fast, sampled ramps. During the transmit ramp (shown as an up-chirp), the FMCW radar device 1 mixes the received signal with the locally generated ramp. Time delayed signals and Doppler exhibit themselves as frequency shifts or components on the received signal. FIG. 6 schematically illustrates matrix processing to transform from a time-frequency representation (top left) to a range and Doppler representation (top right) using a 2D fast Fourier transform (FFT). Also shown by way of example is further signal processing that is often carried out on the resulting range-Doppler matrix for illustration. A matrix of elements from different sub-array elements can then be combined (bottom left) to an L×N×M Doppler sub-array matrix. Further signal processing such as FFT based beam forming may then be performed on the Doppler sub-array matrix, resulting in a L×M×N range, Doppler, angle matrix representation (bottom right). For one ramp, the frequency offset between the ramp and the received echo translates to a Range/Doppler representation after applying a first FFT processing step. In general, Doppler and range can then be unambiguously resolved by taking multiple ramps and applying a second FFT processing step across the Doppler dimension (i.e., across the ramps).

The embodiments disclosed herein relate to detecting blocking of the FMCW radar device 1. Blocking may be caused by portions of the radio frequency (RF) energy propagating to and from the antenna elements of the Tx 7 and Rx 6 of the FMCW radar device 1 being blocked. That is, blocking may be defined by a physical object being placed so as to cover the field of view of the FMCW radar device 1 (in terms of Tx 7 field of view and/or Rx 6 field of view). Such blockage may, for example, be the result of an accumulation, over a period of time, of foreign matter or objects in the region of an antenna aperture. Such foreign matter may be caused for example by environmental conditions such as temperature, humidity, ice, rain and the like. In order to obtain blocking detection of the FMCW radar device 1 there is provided an FMCW radar device 1, a method performed by the FMCW radar device 1, a computer program comprising code, for example in the form of a computer program product, that when run on an FMCW radar device 1, causes the FMCW radar device 1 to perform a method of detecting blocking.

Figure 2:
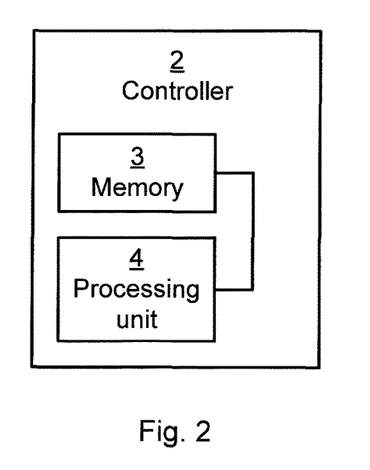
FIG. 2 is a schematic diagram showing functional modules of controller.

FIG. 2 schematically illustrates, in terms of a number of functional modules, the components of the controller functional block 2 of the FMCW radar device 1 illustrated in FIG. 1. A processing unit 4 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 10 (as in FIG. 4), e.g. in the form of a memory 3. Thus the processing unit 4 is thereby arranged to execute methods as herein disclosed. The memory 3 may also include persistent storage, which, for example, can be any single one or combination of magnetic memory, optical memory, solid state memory or even remotely mounted memory. The controller 2 controls the general operation of the FMCW radar device 1, e.g. by sending control signals to the signal generator 5 and receiving signals from the Rx 7. Other components, as well as the related functionality, of the controller 2 are omitted in order not to obscure the concepts presented herein.

Figure 4:
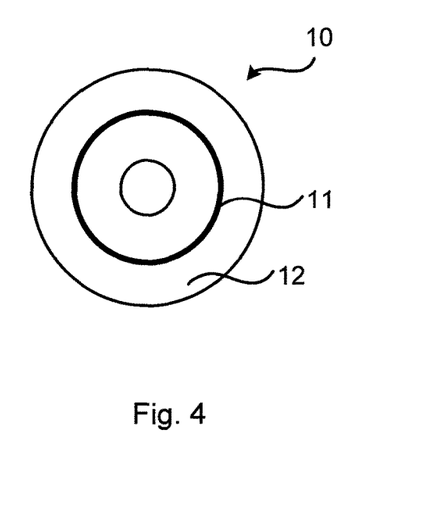
FIG. 4 shows one example of a computer program product comprising computer readable means.
Figure 10:
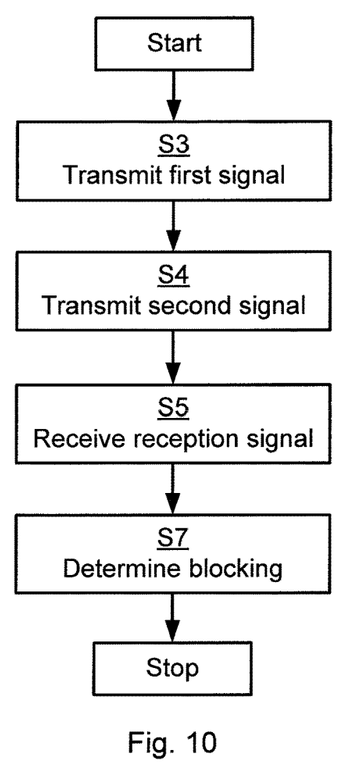
FIGS. 10 and 11 are flowcharts of methods according to embodiments.
Figure 11:
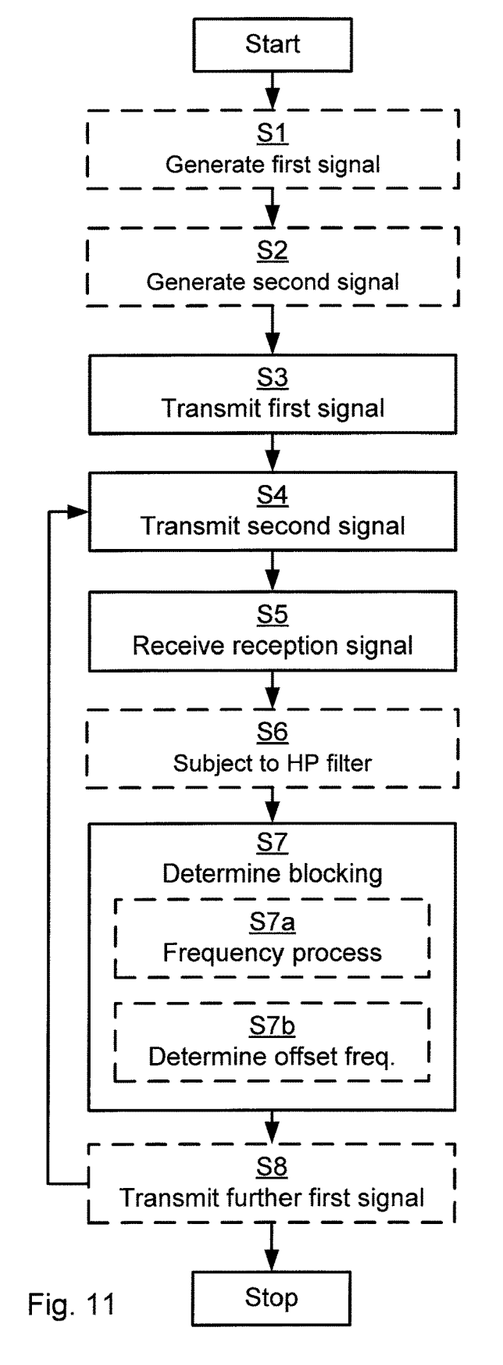

FIGS. 10 and 11 are flow charts illustrating embodiments of methods for detecting blocking of an FMCW radar device 1. The methods are performed by the FMCW radar device 1. The methods are advantageously provided as computer programs 11. FIG. 4 shows one example of a computer program product 10 including computer readable means 12. On this computer readable means 12, a computer program 11 can be stored, which computer program 11 can cause the controller 2 and thereto operatively coupled entities and devices to execute methods according to embodiments described herein. In the example of FIG. 4, the computer program product 10 is illustrated as an optical disc, such as a CD (compact disc) or a DVD (digital versatile disc) or a Blu-Ray disc. The computer program product 10 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 11 is here schematically shown as a track on the depicted optical disk, the computer program 11 can be stored in any way which is suitable for the computer program product 10.

Figure 7:
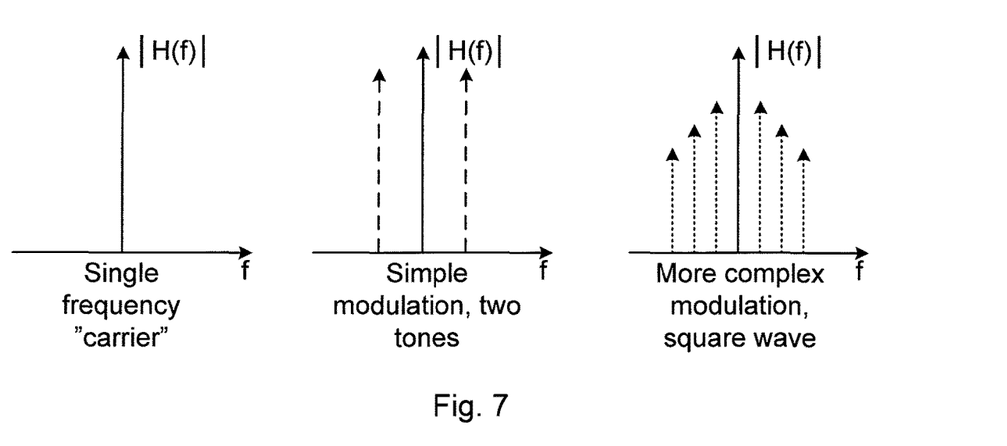
FIG. 7 schematically illustrates frequency components of a transmission signal.

The inventors of the enclosed embodiments have realized that it is possible to insert a test signal from the signal generator 5 part of the FMCW radar device 1 or turn the Tx 7 on/off at frequency that is within the intermediate frequency (IF) passband that modulates the FMCW ramp to generate offset sideband frequencies. A signal representing these sideband frequencies can propagate as a normal transmission waveform through the transmission chain, off a bumper on a vehicle 9, between the antennas of the Tx 7 and Rx 6 through the Rx 6 receiver chain, into the controller 2 and be processed by part or all of already existing signal processing paths. This test signal could result in an offset frequency in the Rx 6, effectively shifting up in frequency the zero range (or very close to zero frequency components) that are normally attributed to the bumper return and in a normal system significantly attenuated by a high pass filter. The enclosed embodiments are thus based on the understanding that a second signal being a frequency offset signal relative a first signal being a first transmission signal including an object detection signal is generated by the FMCW radar device 1. This second signal would impart offset frequency components (side bands etc.) relative the main carrier of the first signal, as illustrated in FIG. 7, and then hence onto the FMCW ramp signal. As schematically illustrated in FIG. 7 a single carrier frequency (left part) can have two or more side bands (or offset frequencies) representing the second signal (middle part and right part) using common modulation techniques. The main carrier can then be ramped (swept in frequency) as disclosed with reference to FIG. 5 and the offset modulation tones will sweep also at a fixed offset to the main carrier.

A method for detecting blocking of a frequency-modulated continuous-wave, FMCW, radar device 1 thus includes, in a step S3, transmitting a first signal being a first transmission signal. The first signal includes an object detection signal. The transmission signal is transmitted by the Tx 7 of the FMCW radar device 1. The Tx 7 is further arranged to, in a step S4, transmit a second signal. The second signal is a frequency offset signal relative the first signal. In view of the above the second signal embodies the test signal.

Figure 8:
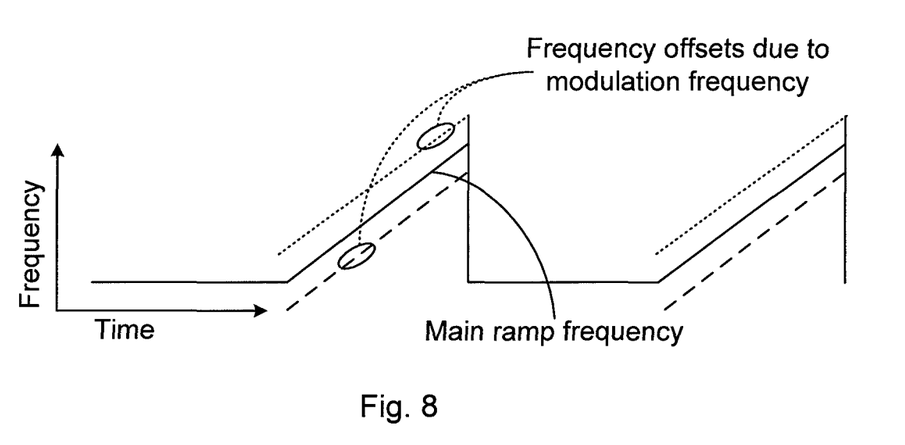
FIG. 8 schematically illustrates main ramp frequency and offset "side bands" due to modulating test tone frequency.

There may be different ways of generating the first and second signals, respectively. According to an embodiment the signals are generated as follows. In a step S1 the first signal is generated. The first signal may be generated by the signal generator 5. According to an embodiment, the first signal is an up chirp ramp signal or a down chirp ramp signal. In a step S2 the second signal is generated from at least two frequency shifted versions of the first signal. The second signal may be generated by the signal generator 5. In more detail, FIG. 8 illustrates a main ramp frequency and offset "side bands" due to the modulating test tone frequency. Shown here is two-tone modulation (which generate two offset ramps).

Phase shift keying may be utilized to generate the second signal. In general terms, the second signal may be based on phase shift keying modulation in the Tx path, amplitude modulation using switches (or turning the Tx side on and off) coded pulses or any other modulation scheme. According to an embodiment, steps S1 and S2 are performed prior to steps S3 and S4. According to an embodiment steps S1 and S2 are performed during a pre-configuration phase of the FMCW radar device 1. The first signal and/or the second signal may then be stored in the memory 3 of the controller 2. Either the full signal waveforms are stored in the memory 3 or just the parameters needed to generate the signal waveforms are stored in the memory 3.

Figure 9:
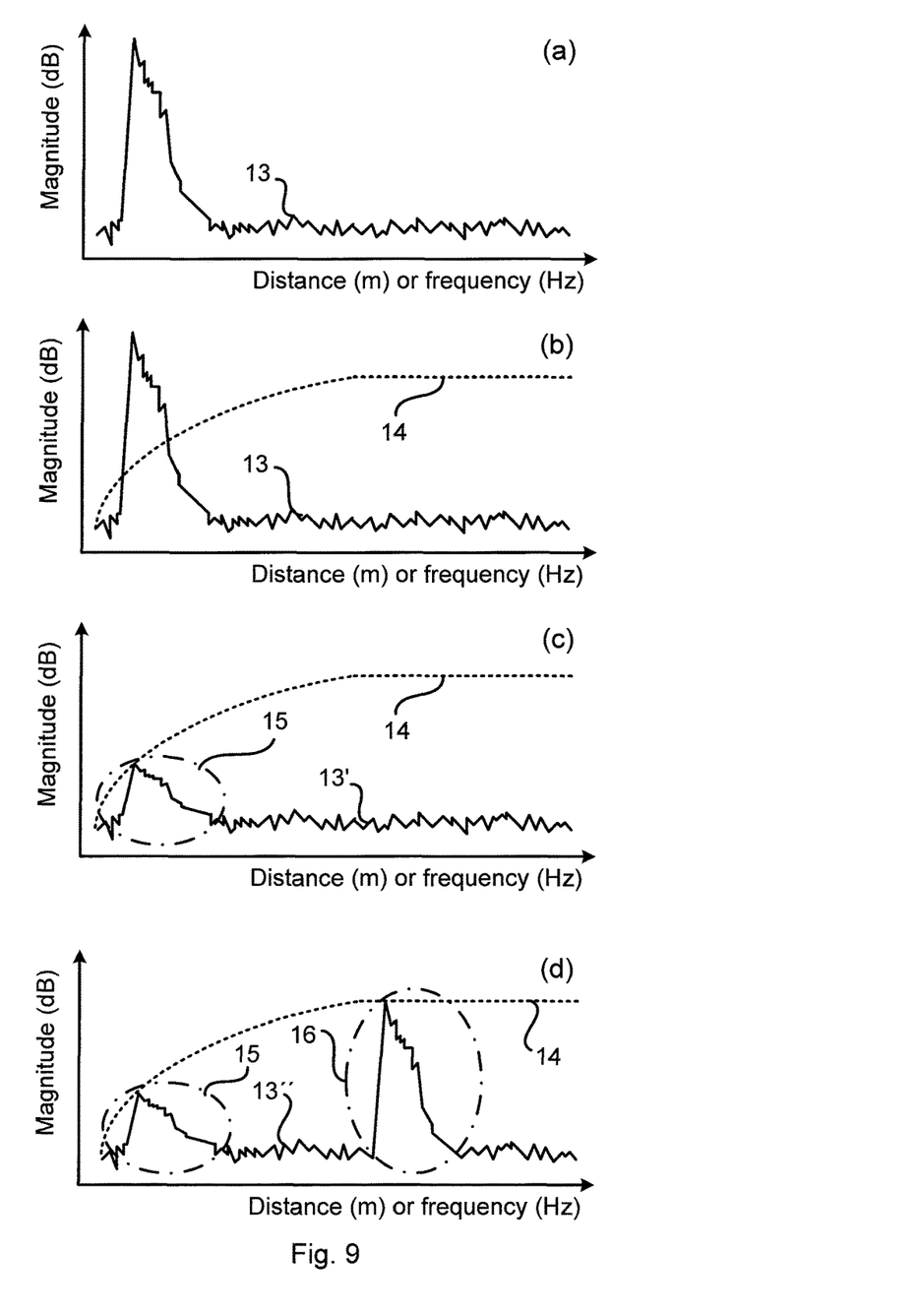
FIG. 9 schematically illustrates magnitude of a reception signal as a function of distance or frequency.

At least the second signal is received by the FMCW radar device 1 as a reception signal. In general terms the reception signal will depend on objects onto which the signals as transmitted in steps S3 and S4 have reflected. The Rx 6 of the FMCW radar device 1 is therefore arranged to, in a step S5, receive a reception signal, where the reception signal includes at least a received version of the second signal. The reception signal may, for example, be received by close in reflections due to close objects. According to an embodiment the reception signal is thus received from device external reflection. In an optional step S6 the reception signal may be subjected to high pass filtering. This is illustrated in FIG. 9. FIG. 9 (*a*) schematically illustrates a reception signal 13. In FIG. 9 (*b*) a high pass filter 14 is applied to the reception signal 13. Subjecting the reception signal 13 to high pass filtering as in step S6 thus causes low frequency (or distance) components 15 of the reception signal 13 to be attenuated. The corresponding high pass filtered signal 13' is illustrated in FIG. 9 (*c*). The low frequency (or distance) components 15 of the reception signal 13 may correspond to contributions in the return signal of the first signal. Thus, due to the attenuation of the reception signal 13' in FIG. 9 (*c*) it may be difficult to determine blocking based on an analysis of the components 15 of the attenuated reception signal 13' corresponding to contributions in the return signal of the first signal. FIG. 9 (*d*), on the other hand, illustrates a reception signal 13" comprising at least a received version of the second signal. Due to close range the frequency offset caused by the modulation of the Tx transmission of the second signal shifts the return of the second signal up in frequency such that the return of the second signal is not attenuated by the high pass 14 characteristics.

The controller 2 is thus arranged to, in a step S7, determine blocking by identifying a blocking pattern 16 in the received version of the second reception signal. The blocking pattern 16 thus corresponds to the return of the second signal (as frequency shifted relative the first signal). In general terms the FMCW radar device 1 has a field of view. The detected blocking may thus provide an indication of transmission from the FMCW radar device 1 being blocked by a physical object being placed so as to cover the field of view. Absence of the blocking pattern 16 in the reception signal (i.e., where a blocking pattern 16 is not detected) may indicate that there is no blocking.

According to an embodiment, the controller 2 is arranged to determine the blocking as in step S7 by performing an optional sub-step S7*a* of frequency processing an offset frequency component in the reception signal. The offset frequency component is indicative of the blocking pattern and is associated with a frequency shifted zero-frequency bin. When the reception signal is processed in a normal way by the controller 2 (i.e. as a normal reception signal) performing FFT1 processing, the constant frequency offset shows up as a single (deterministic) signal in a single range gate. According to an embodiment the controller 2 is therefore arranged to determine the blocking as in step S7 (or as in step S7 in combination with step S7*a*) by performing an optional sub-step S7*b* of determining the offset frequency component as a deterministic signal received in a single range gate. The constant frequency offset may show up as a single (deterministic) signal in a single range gate spread over a number of FFT bins due to interaction with the radome 8 and/or an external object. Thus, it is this frequency or group of frequencies that can be examined to determine the clutter or blockage state of the near field of the FMCW radar device 1 as they have effectively been moved from the zero range bin position which would normally be attenuated by the AC coupling in the IF hardware.

The modulating frequency and waveform may generate a particular range/Doppler pattern that can be determined directly from the modulating parameters. Particular range and/or Doppler bins can be examined to see if they contain the components corresponding to the second signal. For example, if the correct pattern of the second signal does not appear whilst the second signal is transmitted it is likely that there is an object blocking at least one of the Tx 7, Rx 6 or radome 8 of the FMCW radar device 1. The deterministic signal as determined in step S7*b* may for example include frequency components spread in at least two adjacent frequency range bins and/or Doppler bins.

In general terms, the frequency spacing of the tones (therefore the range bin they appear in) is determined by the modulating waveform. There may also be an amplitude relationship between these tones (for example, the tones should all be relative to one another). This may provide further information about the fidelity of the analogue and digital signal processing chain (for example how it is behaving as a function of frequency). According to embodiments of this invention the second signal therefore includes at least two positive frequency components, each corresponding to a tone. The frequency spacing between the tones may be determined by the modulating waveform of the first signal.

In general terms, the step S3 of transmitting the second signal is performed in accordance with the functional safety and reliability requirements of the FMCW radar device 1. The Tx 7 may therefore be arranged to, in a step S8, transmit a further first signal being a further first transmission signal, where the further first signal includes the object detection signal. The second signal being the frequency offset signal may then be transmitted at the end of each sensor cycle and/or at power up of the FMCW radar device 1. Further for example, during power up of the FMCW radar device 1 a larger number of transmissions of the second signal may be transmitted in comparison to transmissions of the second signal at the end of a sensor cycle. Thereby transmissions of the second signal during power up may represent more comprehensive blocking detection. According to an embodiment the step S4 of transmitting the second signal being the frequency offset signal is performed at least during start-up of the FMCW radar device, once every I:th transmission of the further first signal, where I≥1, and/or once every J:th millisecond during operation of the FMCW radar device, where J≥1. According to one embodiment the step of transmitting the second signal is performed 25 times per second.

For example, the FMCW radar device 1 may be operatively coupled to a weather indication system (not shown). The weather indication system may thus provide a weather indication signal to the FMCW radar device 1. The controller 2 of the FMCW radar device 1 may thereby be arranged to schedule transmission of the second signal based on the weather indication signal. For example an indication of precipitation, such as rain and/or snow, may result in the second signal being transmitted more often than in cases an indication of no precipitation is received. This may enable enhanced detection of water (such as ice or snow) or mud in front of the Tx 7. For example the second signal may be transmitted more often in cases of a temperature indication of a temperature below the freezing point of water than in cases of a temperature indication of a temperature above the freezing point of water. This may enable enhanced detection of ice or snow in front of the Tx 7.

Figure 3:
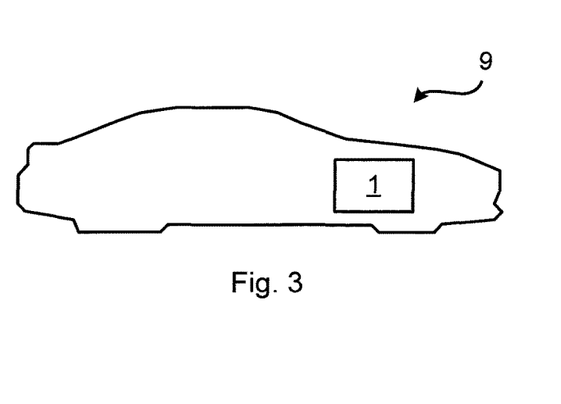
FIG. 3 is a schematic diagram showing functional modules of a vehicle.

The FMCW radar device 1 may be part of a radar arrangement for automotive radars, such as a 77 GHz FMCW radar arrangement. Particularly, the FMCW radar device 1 may be provided in an automotive vehicle 9. FIG. 3 illustrates an automotive vehicle 9 comprising an FMCW radar device 1.

While the above description constitutes the preferred embodiment of the present invention, it will be appreciated that the invention is susceptible to modification, variation and change without departing from the proper scope and fair meaning of the accompanying claims.

The invention claimed is:

1. A method for detecting blocking of a frequency-modulated continuous-wave (FMCW), radar device, comprising the steps of:
    generating a first signal;
    generating a second signal from at least two frequency shifted versions of the first signal;
    transmitting the first signal being a first transmission signal, the first signal comprising an object detection signal;
    transmitting the second signal being a frequency offset signal relative the first signal;
    receiving a reception signal, the reception signal comprising at least a received version of the second signal; and
    determining blocking by identifying a blocking pattern in the received version of the second reception signal.

2. The method according to claim 1, further comprising:
    subjecting the reception signal to a high pass filtering prior to the determining blocking step.

3. The method according to claim 1, wherein the determining blocking step further comprises:
    frequency processing an offset frequency component in the reception signal, the offset frequency component being indicative of the blocking pattern and associated with a frequency shifted zero-frequency bin.

4. The method according to claim 3, wherein the determining blocking step further comprises:
    determining the offset frequency component as a deterministic signal received in a single range gate.

5. The method according to claim 4, wherein the deterministic signal comprises frequency components spread in at least two adjacent frequency range bins or Doppler bins.

6. The method according to claim 1, wherein the FMCW radar device has a field of view, and wherein the determining blocking step provides an indication of transmission from the FMCW radar device being blocked by a physical object being placed so as to cover the field of view.

7. The method according to claim 1, wherein the first signal is an up chirp ramp signal or a down chirp ramp signal.

8. The method according to claim 1, wherein the reception signal is received from a device external reflection.

9. The method according to claim 1, further comprising the steps of:
    transmitting a further first signal being a further first transmission signal, the further first signal comprising the object detection signal; and
    wherein the step of transmitting the second signal being the frequency offset signal is performed at least one of: during start-up of the FMCW radar device, once every I:th transmission of the further first signal, where I≥1, and once every J:th millisecond during operation of the FMCW radar device, where J≥1.

10. The method in accordance with claim 1, wherein the blocking is in the form of a physical barrier interfering with the transmission or reception of the frequency-modulated continuous wave.

11. A frequency-modulated continuous-wave (FMCW), radar device for detecting blocking of the FMCW radar device, comprising:
    a signal generator configured to generate a first signal;
    the signal generator configured to generate a second signal from at least two frequency shifted versions of the first signal;
    a transmitter arranged to transmit the first signal being a first transmission signal, the first signal comprising an object detection signal;
    the transmitter further being arranged to transmit the second signal being a frequency offset signal relative the first signal;
    a receiver arranged to receive a reception signal, the reception signal comprising at least a received version of the second signal; and
    a controller arranged to determine blocking by identifying a blocking pattern in the received version of the second reception signal.

12. The FMCW radar device of claim 11, wherein the FMCW radar device is mounted to an automobile.

13. The radar device in accordance with claim 11, wherein the blocking is in the form of a physical barrier interfering with the transmission or reception of the frequency-modulated continuous wave.

14. A non-transitory computer readable medium for detecting blocking of a frequency-modulated continuous-wave (FMCW), radar device, the non-transitory computer readable medium having instructions sorted thereon, which when executed by a radar device cause the radar device to:
    generate a first signal;
    generate a second signal from at least two frequency shifted versions of the first signal;
    transmit the first signal being a first transmission signal, the first signal comprising an object detection signal;
    transmit the second signal being a frequency offset signal relative the first signal;
    receive a reception signal, the reception signal comprising at least a received version of the second signal;
    determine blocking by identifying a blocking pattern in the received version of the second reception signal.

* * * * *